United States Patent

Veau

[11] Patent Number: 5,316,318
[45] Date of Patent: May 31, 1994

[54] ANNULAR BRUSH GASKET

[75] Inventor: Albert Veau, Combs La Ville, France

[73] Assignee: Societe Nationale D'Etude et de Construction de moteurs D'Aviation "Snecma", Paris, France

[21] Appl. No.: 49,327

[22] Filed: Apr. 21, 1993

[30] Foreign Application Priority Data

Apr. 23, 1992 [FR] France .................. 92.04985

[51] Int. Cl.$^5$ ............................................ F16J 15/447
[52] U.S. Cl. ........................................ 277/53; 278/192
[58] Field of Search .......................... 277/53, 169, 192

[56] References Cited

U.S. PATENT DOCUMENTS

| 885,032 | 4/1908 | Ferranti | 277/53 X |
|---|---|---|---|
| 5,066,024 | 11/1991 | Reisinger et al. | 277/53 |
| 5,074,748 | 12/1991 | Hagle | 277/53 X |
| 5,100,158 | 3/1992 | Gardner | 277/53 |
| 5,174,582 | 12/1992 | Ferguson | 277/53 |
| 5,176,389 | 1/1993 | Noone et al. | 277/53 |

FOREIGN PATENT DOCUMENTS

| WO86/05252 | 9/1986 | European Pat. Off. . | |
|---|---|---|---|
| 0293140 | 11/1988 | European Pat. Off. . | |
| 4029010 | 1/1992 | Fed. Rep. of Germany . | |
| 1049092 | 12/1953 | France | 277/53 |
| 1523768 | 11/1989 | U.S.S.R. | 277/53 |
| 774032 | 5/1957 | United Kingdom | 277/169 |

Primary Examiner—William A. Cuchlinski, Jr.
Assistant Examiner—Scott W. Cummings
Attorney, Agent, or Firm—Oblon, Spivak, McClelland, Maier & Neustadt

[57] ABSTRACT

An annular brush gasket makes it possible to ensure imperviousness between two zones wherein a pressure difference exists between the zones, even when the shaft is moved off center. The body of the gasket is mainly formed of several annular sectors disposed so as to form a ring around the shaft and each sector is pivotally mounted to the stator. A retaining ring or snap ring elastically biases the filaments of the sectors against the shaft despite any outward movement of the shaft center.

7 Claims, 3 Drawing Sheets

ANNULAR BRUSH GASKET

FIELD OF THE INVENTION

The invention concerns imperviousness between two gaseous volumes subjected to different pressures and situated around a rotary shaft. This need for imperviousness is encountered when producing aeronautical turbojet engines.

BACKGROUND OF THE INVENTION

With reference to FIG. 1, in certain types of turbojet engines, the need to ensure imperviousness is tested between two annular chambers 1, 2 delimited by a partition 3 of the turbine distributor 4 which is fixed and one partition 5 of the turbine rotor 6 which rotates around the main axis of the turbojet engine. Of course, the partition 5 of the rotor 6 rotates with respect to the partition 3 of the turbine distributor 4.

The method is known on how to use a labyrinth type gasket so as to ensure imperviousness between these two chambers 1 and 2. However, this type of gasket takes up a large amount of space and does not provide full imperviousness between the two chambers 1 and 2.

On the other hand, the ROLLS-ROYCE Patent GB-1 598 926 describes a "brush" type gasket mainly constituted by a bundle of fibers or filaments placed perpendicular to a shaft and at a minimal distance from the latter so that the extremities of the fibers or filaments are flush with the shaft around which the gasket is to be mounted so as to ensure imperviousness on both sides of this gasket. The bundle of filaments is supported by two flanges rendered integral with a fixed support.

With this type of gasket, imperviousness may be effected completely, provided the shaft rotates fully circularly, that is no outward movement of the center which may occur in relation to the rotation of this shaft. In fact, if the shaft comprises an unbalanced mass or rotates with a pronounced moving out of center, the almost continuous contact between the shaft and the extremity of the filaments of the brush gasket makes the latter function with buckling and results in obtaining the following effects:
 premature deterioration of the flexible extremity of each wire of the brush gasket via crushing,
 ultrarapid heating of the contact zone between the gasket and the shaft (this heating limited to the approximate width of the gasket is that much greater when the speed of rotation of the shaft is high).

The object of the invention is to resolve these drawbacks or delay the deterioration of the filaments of the brush gasket and the heating produced by contact.

SUMMARY OF THE INVENTION

To this effect, the main subject of the invention is an annular brush gasket intended to ensure imperviousness between two annular volumes delimited by a shaft with a specific axis and around which a housing is mounted, one movement of rotation around said axis taking place between the shaft and the housing. This gasket mainly includes :
 an annular brush body formed of two flanges and mounted in the housing, and
 arcuate filaments mounted via one first extremity in the brush body and and orientated towards the shaft so that their second extremity is flush with the shaft so as to create a sealed curtain between the two annular volumes.

According to the invention, the brush body is constituted by several ring-shaped sectors mounted in the housing so as to enable the filaments to slightly distanced from the shaft by being inclined with respect to the axis of the shaft and thus authorize a outward movement of the center of the shaft with respect to the housing, while ensuring imperviousness between the two annular volumes.

As regards the design of the brush body, it is preferable that each annular sector has one head at one first extremity with each sector being mounted in one cylindrical throat of the housing so as to allow for a pivotal movement of the brush body with respect to the shaft in order to obtain a spacing of the filaments with respect to the shaft.

The sectors of the brush body are preferably embodied with the aid of two flanges placed against each other.

This main embodiment is advantageously completed by coverings on one of the two flanges thus overlapping two adjacent sectors so as to ensure continuity of the imperviousness of the gasket.

The sectors are advantageously kept in place by an elastic joint held against a second extremity of the brush head opposing the head so as to keep the sectors of the brush body clamped against the others in an idle position in which the filaments are slanted as little as possible with respect to the radial plane of the axis of the shaft.

Secondly, the European patent EP-A-0 293 140 document describes a brush gasket whose filaments or hairs are slanted radially. In other words, they are not perpendicular to the surface of the shaft on which they rub.

In one advantageous embodiment of the invention, the filaments are slanted in the direction of rotation of the shaft.

The brush gasket of the invention is particularly effective when two rotating stops placed on the housing are disposed so as to limit rotation of the sectors of the brush body.

BRIEF DESCRIPTION OF THE DRAWINGS

The invention and its various technical characteristics shall be more readily understood from a reading of the following description with reference to the accompanying figures on which.

DESCRIPTION OF THE PREFERRED EMBODIMENTS

Figure 1:
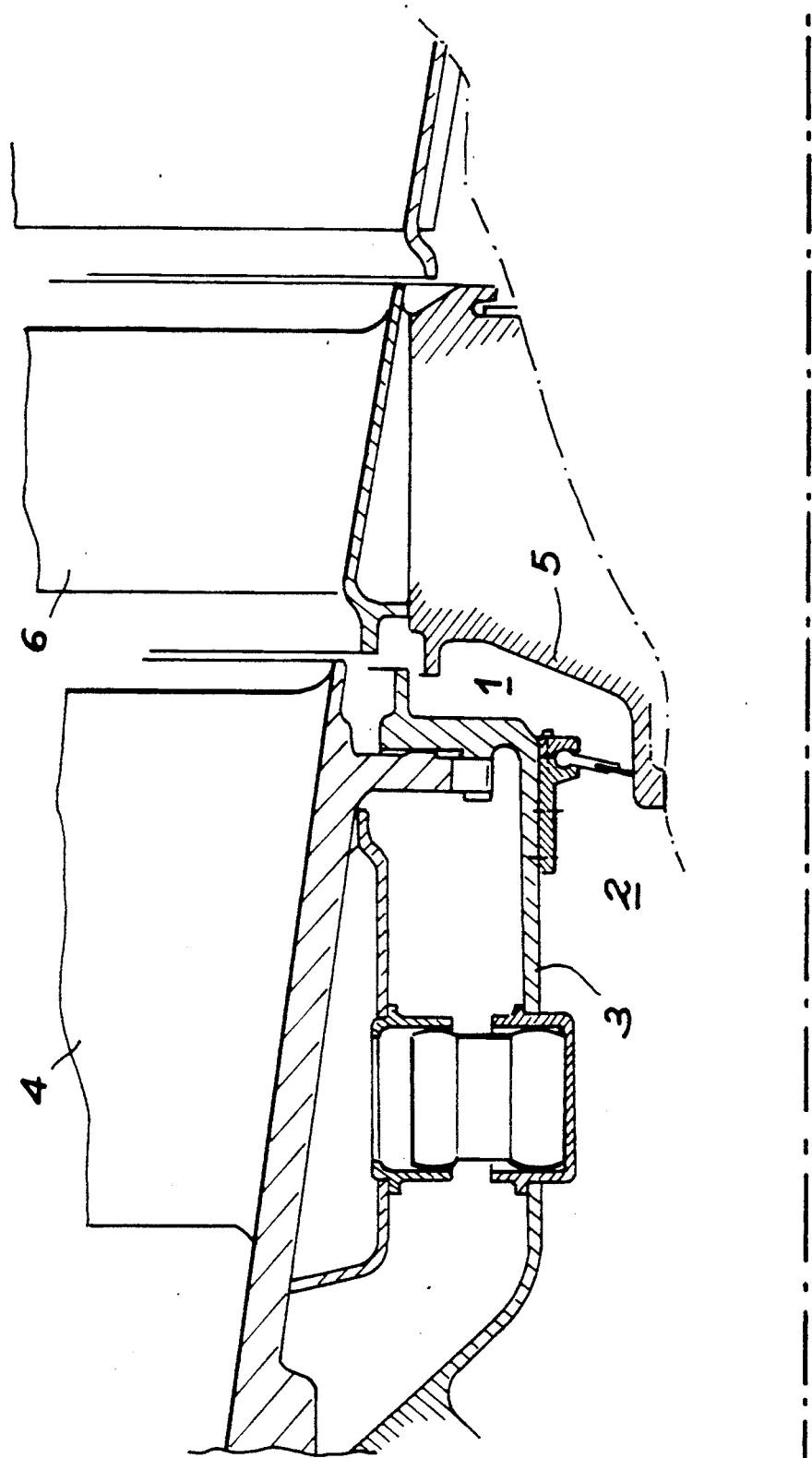
FIG. 1 shows an example for using the brush gasket of the invention in a turbojet engine.
Figure 2:
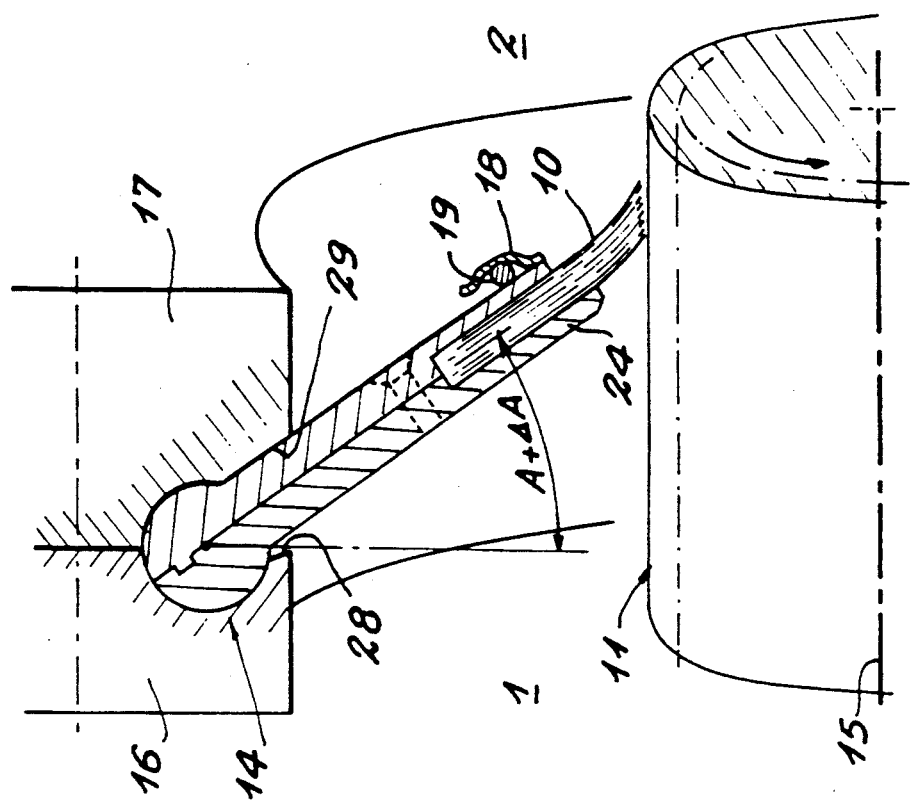
FIGS. 2A and 2B are cutaway views of two positions of the brush gasket of the invention.
Figure 2:
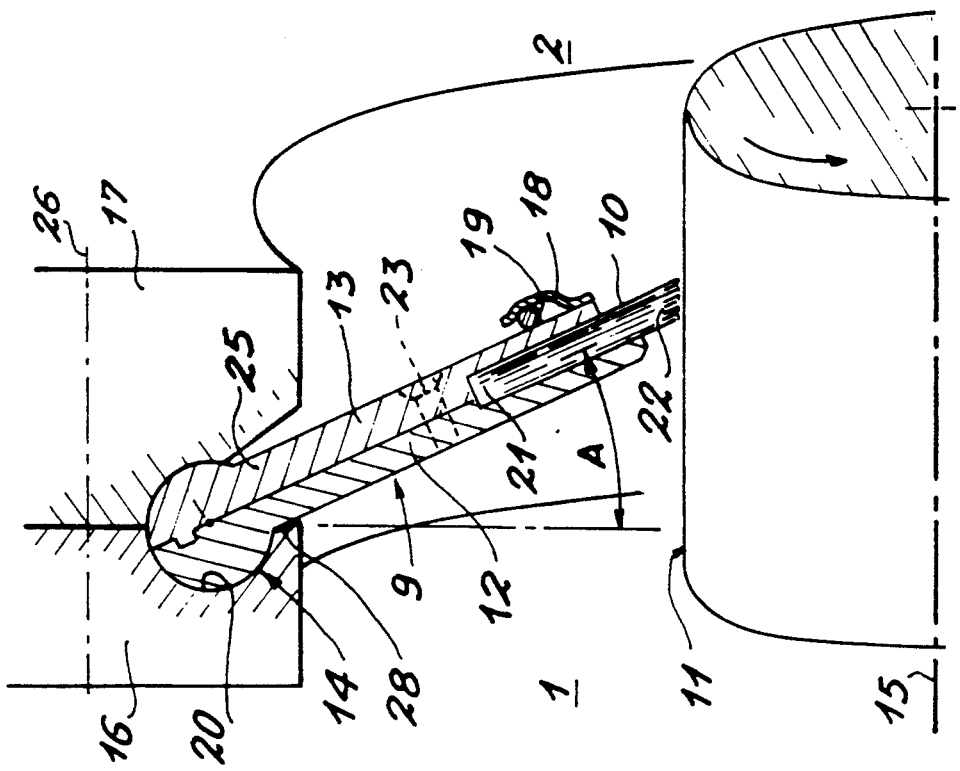

With reference to FIGS. 2A and 2B, the brush gasket of the invention mainly includes a brush body 9 to which a bundle of filaments 10 (fibers, hairs or other filiform elements) is secured. This gasket is shown beside a rotary shaft 11 able to rotate around its longitudinal axis of rotation 15. Secondly, the gasket is mounted with respect to a fixed stator. This stator is constituted on the embodiment represented by two fixed flanges 16 and 17. One first extremity 21 of the filaments 10 is placed in the brush body 9. A second extremity 22 of the filaments 10 is placed against the outer surface of the shaft 11 so as to be flush with the latter.

One can readily perceive that the brush gasket can constitute a sealed partition between one first annular zone 1 and one second annular zone 2, both delimited by the rotary shaft 11 and the support represented by the two flanges 16 and 17.

According to the invention, the brush gasket is slanted with respect to the planes which are radial or perpendicular to the longitudinal axis 15 of the shaft 11. In other words, these two FIGS. 2A and 2B show that the brush gasket is not vertical.

According to the invention, the body 9 of the brush gasket is mounted so as to be able to pivot slightly with respect to the stator. Owing to this, the filaments 10 constituting the bundle of the brush may be distanced from or brought more or less closer to the outer surface f the rotary shaft 11 by means of this pivoting. Thus, it can be readily understood that the brush gaskets are able to adapt themselves at each moment to any possible different prompt radii of the the rotary shaft 11 opposite the filament bundle 10. Thus, if there is an unbalanced mass or moving out of center during rotation of this shaft 11, the brush gasket is able to adapt via a slight pivoting to this small radius variation.

FIGS. 2A and 2B show the two extreme positions of the brush gasket. FIG. 2A shows that the inclination of the body 9 with respect to the vertical axis of the figure forms an angle A. The second extremities 22 of the filaments 10 then scarcely touch the external surface of the shaft 11.

On FIG. 2B, the inclination of the brush body 9 with the same vertical axis forms an angle A+ΔA. In fact, the brush body 9 for pivoting and the second extremities 22 of the filaments 10 are still in contact with the outer surface of the shaft 11 as the latter has moved into a position in the direction of the gasket under the effect of the shaft 11 being moved off center. In other words, this shaft has pushed back the filaments 10 of the brush gasket. Contact has taken place between the brush gasket and the shaft 11. As a result, imperviousness between the two volumes 1 and 2 is retained, despite a pressure difference existing between these volumes.

These two FIGS. 2A and 2b show that in one possible embodiment of the brush body 9, the latter is formed of two flanges 12 and 13 plated against each other by means, for example, of a fixing screw 23. The first extremity 21 of the filaments 10 of the bundle is enclosed by the second extremity 24 of the two flanges 12 and 13.

Via the first extremity 25, the brush body 9 is mounted for pivoting in the stator by means of a head 14. This head constitutes a sort of joint and may be formed of two fundamental hemispherical portions respectively of the flanges 12 and 13. To correspond with the above, a throat 13 is provided in the stator. This stator may be formed of two fixing flanges 16 and 17 assembled by bolts symbolized by a fixing pin 26.

Because the brush gasket is ring-shaped, that is it is able to fully surround the shaft 11, this means that this gasket is unable to pivot if It is formed of a single rigid piece. In fact, the pivoting symbolized by the two FIGS. 2A and 2b requires a change of the perceptible diameter of the second extremity 24 of the brush body 9 which may not take place unless the brush body 9 is made of an extremely deformable material. As a result, according to the invention, the brush body 9 of the gasket is made up of several brush body sectors.

Figure 3:
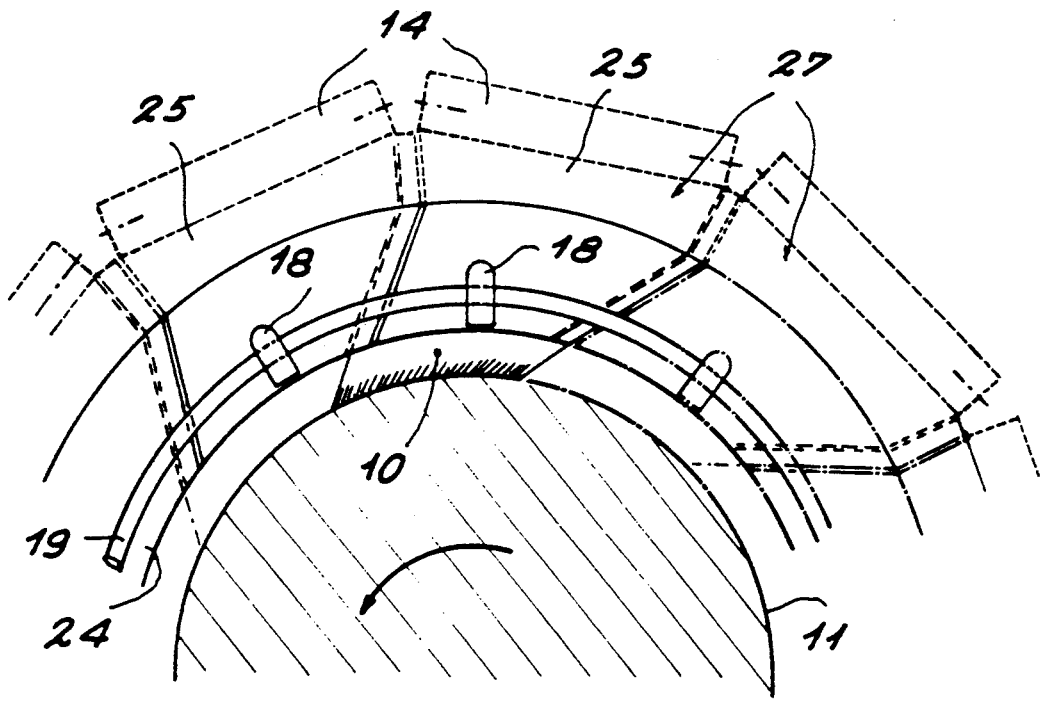
FIG. 3 is a frontal view of the brush gasket of the invention when disposed around a shaft.

As shown in FIG. 3, the sectors 27 of the brush body are distributed around the shaft 11 in a way similar to the petals of a flower. The rotation of each of the sectors 27 is obtained by means of the fact that the groove indicated by reference number 20 in the preceding figures is in made Up of several hollow cylindrical sectors, each sector corresponding to one sector 27 of the brush body and more precisely to one head sector 14. Thus, each sector 27 of the brush body is able to pivot with respect to the stator.

So as to limit clearance of pivoting of the sectors 27 of the brush body 9 with respect to the stator, each of the two flanges 16 and 17 of the latter has a slanted surface stop member, respectively 28 and 29, at the base of the throat 20.

The brush gasket of the invention is provided to function between two volumes 1 and 2, the pressure existing in the volume 2 being greater than the pressure existing in the volume 1. As a result, in normal operation, the gasket is plated against the stop 28 of the fixing flange 16 in the position shown on FIG. 2A. A predetermined play may be provided in this position between the extremity of the filaments 10 and the external surface of the shaft 11.

So as to ensure this position of the filaments 10 with respect to the outer surface of the shaft 11, it is necessary to keep the various sectors 27 in the least inclined position of the brush body 9 shown on FIG. 2A. A device for obtaining the above consists of using a snap ring 19 applied to the second extremity 24 of the sectors 27 of the brush body 9. As shown on FIGS. 3 and 2A, in order to obtain this result, it is possible to use open and slightly elastic lugs or eyelets 18 so as to allow for introduction of the snap ring 19 inside. Thus, it is possible to provide a lug 18 on each of one of the two flanges 13 of each sector 27 of the brush body 9.

FIG. 3 shows that the filaments 10 are slanted in the direction of rotation of the shaft 11, that is when they are not perpendicular to the outer surface of the latter. This favors the contacts of the extremities of the filaments 10 on this surface and limits wear of the gasket.

If, as shown on FIG. 2B, an outward movement of center of the shaft 11 occurs, the latter tends to push back the filaments 10. The various sectors 27 of the gasket are then gradually deployed around the shaft 11 during this moving out of center. The elasticity of the snap ring 19 and its relative mobility in the fixing lugs 18 allow for both the deployment of each sector 27 at the upper point of moving off center and moving them back towards the shaft 11 at the low point of this moving out of center. The stop 28 may then allow for observing any possible minimal play between the extremity of the filaments 10 and the shaft 11.

Figure 4:
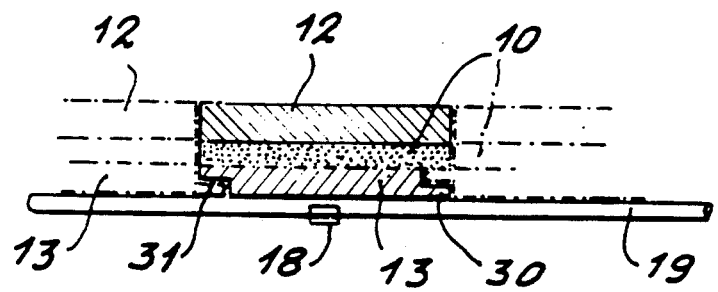
FIG. 4 is a transverse cutaway view of a sector of the brush gasket of the invention.

As shown on FIG. 4, one of the two flanges 13 of the brush body 9 may comprise a covering 30 projecting with respect to the other flange 12 so as to become embedded in a corresponding horizontal flexure 31 of the flange of the adjacent sector. Thus, full imperviousness of the gasket may be ensured during the various movements of the sectors 27 in relation to one another. These coverings 30 are preferably placed on the side where the pressure exerted on the gasket is strongest. Owing to the inclination of the filaments 10 of the gasket in the direction of rotation of the shaft 11, continuity of imperviousness is ensured. In fact, when the segments 17 open, the filaments 10 remain in contact with one another.

The annular brush gasket has a certain number of advantages.

Improved contact flexibility is obtained between the gasket and the shaft 11, hence providing a better calorific dissipation on the latter, Buckling linked to the perpendicularity of the filaments 10 of the gasket in relation to the outer surface of the rotary shaft 11 is eliminated. Thus, the period of life of the gasket is prolonged, In the event of any accidental deterioration of a sector 27 of the gasket, the latter may be replaced whilst retaining the other sectors, Of course, imperviousness between the two zones to be separated is maintained, despite the shaft moving out of center.

What is claimed is:

1. Annular brush gasket for providing imperviousness between two annular volumes delimited by a rotary shaft with a specific axis and a housing, the shaft being rotatable about the axis thereof in the housing, said gasket comprising:
   a brush body mounted in the housing, and
   a plurality of filaments mounted in the brush body so as to be slanted with respect to the axis of the shaft and fixed via first extremities thereof in the brush body and orientated towards the shaft so that the respective second extremities thereof are flush with the shaft so as to create a sealed curtain between the two annular volumes, wherein the housing has a groove formed therein and the brush body is ring-shaped and comprises a plurality of arcuate sectors each having a head portion pivotally mounted in the groove in the housing so as to enable the filaments to be slightly distanced from the shaft by being adjustably slanted with respect to the axis of rotation of the shaft and thus allow off centering of the shaft with respect to the housing while ensuring imperviousness between the two annular volumes.

2. Annular brush gasket according to claim 1, wherein the brush body and each sector has a head at a first extremity thereof, each head being mounted in a cylindrical throat of the housing so as to allow for pivoting of each sector of the brush body with respect to the shaft so as to obtain spacing of the filaments with respect to the shaft.

3. Annular brush gasket according to claim 1, wherein the brush body comprises two flanges in contact with each other.

4. Annular brush gasket for providing imperviousness between two annular volumes delimited by a rotary shaft with a specific axis and a housing, the shaft being rotatable about the axis in a housing, said gasket comprising:
   a brush body mounted in the housing, and
   a plurality of filaments mounted in the brush body so as to be slanted with respect to the axis of the shaft and fixed via first extremities thereof in the brush body and oriented towards the shaft so that the respective second extremities thereof are flush with the shaft so as to create a sealed curtain between the two annular volumes wherein the brush body comprises a plurality of arcuate sectors pivotally mounted in the housing so as to enable the filaments to be slightly distanced from the shaft by being slanted with respect to the axis of rotation of the shaft and thus allow off centering of the shaft with respect to the housing while ensuring imperviousness between the two annular volumes, each of the sectors having two flanges in contact with each other and wherein one of the two flanges of each sector has a covering for overlapping a flange portion of the adjacent section so as to ensure continuity of imperviousness.

5. Annular brush gasket according to claim 4, which comprises a snap ring tartly held against a second extremity of the brush body opposing the head of the latter so as to keep the sectors of the brush body elastically clamped against one another in an idle position.

6. Annular brush gasket according to claim 1, wherein the fibers are slanted in the direction of rotation of the shaft.

7. Annular brush gasket according to claim 2, wherein the housing has two stop members so as to limit pivoting of the sectors.

* * * * *